(12) United States Patent
Ali et al.

(10) Patent No.: US 10,303,501 B2
(45) Date of Patent: May 28, 2019

(54) VIRTUAL HIGH PRIVILEGE MODE FOR A SYSTEM MANAGEMENT REQUEST

(75) Inventors: Valiuddin Y Ali, Cypress, TX (US); Jose Paulo Xavier Pires, Porto Alegre (BR); James M Mann, Cypress, TX (US); Boris Balacheff, Lyons (FR); Chris I Dalton, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 906 days.

(21) Appl. No.: 14/240,198

(22) PCT Filed: Aug. 30, 2011

(86) PCT No.: PCT/US2011/049677
§ 371 (c)(1),
(2), (4) Date: Feb. 21, 2014

(87) PCT Pub. No.: WO2013/032442
PCT Pub. Date: Mar. 7, 2013

(65) Prior Publication Data
US 2015/0040130 A1 Feb. 5, 2015

(51) Int. Cl.
*G06F 21/57* (2013.01)
*G06F 9/4401* (2018.01)
*G06F 9/455* (2018.01)

(52) U.S. Cl.
CPC ........ *G06F 9/45558* (2013.01); *G06F 9/4401* (2013.01); *G06F 9/45541* (2013.01); *G06F 21/57* (2013.01); *G06F 21/572* (2013.01); *G06F 21/575* (2013.01); *G06F 2009/45587* (2013.01)

(58) Field of Classification Search
CPC ............ G06F 9/45541; G06F 9/45533; G06F 9/45558; G06F 21/57; G06F 21/572; G06F 21/575; G06F 2009/45587; G06F 9/4401
USPC ........................................................... 718/1
See application file for complete search history.

(56) References Cited

U.S. PATENT DOCUMENTS

| | | | |
|---|---|---|---|
| 5,230,052 A | 7/1993 | Dayan | |
| 5,574,920 A | 11/1996 | Parry | |
| 6,799,316 B1 * | 9/2004 | Aguilar | ............... G06F 9/45537 703/21 |

(Continued)

FOREIGN PATENT DOCUMENTS

| | | |
|---|---|---|
| CN | 101425027 | 5/2009 |
| CN | 101488173 | 7/2009 |

(Continued)

OTHER PUBLICATIONS

Steinberg et al, "NOVA: A Microhypervisor-Based Secure Virtualization Architecture", [Online], 2010, pp. 209-222, [Retrieved from internet on Feb. 19, 2019], <http://eurosys2010.sigops-france.fr/proceedings/docs/p209.pdf> (Year: 2010).*

(Continued)

*Primary Examiner* — Ziaul A Chowdhury
*Assistant Examiner* — Zengpu Wei
(74) *Attorney, Agent, or Firm* — HPI Patent Department

(57) ABSTRACT

A computing system and a method of handling a system management request. The computing system includes a virtual high-privilege mode in a trusted domain managed by the virtual machine monitor. The virtual high-privilege mode handles the system management request.

20 Claims, 3 Drawing Sheets

(56) References Cited

U.S. PATENT DOCUMENTS

| | | | |
|---|---|---|---|
| 7,418,584 B1 | 8/2008 | Klaiber et al. | |
| 7,421,533 B2 | 9/2008 | Zimmer et al. | |
| 7,581,219 B2* | 8/2009 | Neiger et al. | 718/1 |
| 7,840,398 B2 | 11/2010 | Zimmer et al. | |
| 8,429,276 B1 | 4/2013 | Kumar et al. | |
| 8,977,842 B1 | 3/2015 | McCorkendale et al. | |
| 9,275,230 B2 | 3/2016 | Ali et al. | |
| 2002/0152344 A1* | 10/2002 | Holm | G06F 13/24 710/260 |
| 2004/0003323 A1* | 1/2004 | Bennett | G06F 11/0712 714/36 |
| 2004/0103299 A1* | 5/2004 | Zimmer | G06F 21/57 726/26 |
| 2005/0114687 A1* | 5/2005 | Zimmer | G06F 9/4401 713/193 |
| 2005/0210467 A1* | 9/2005 | Zimmer | G06F 21/53 718/1 |
| 2006/0005184 A1 | 1/2006 | Tewari et al. | |
| 2007/0028238 A1* | 2/2007 | Bennett | G06F 9/45558 718/1 |
| 2007/0250691 A1* | 10/2007 | Cool | G06F 9/4401 713/1 |
| 2008/0120499 A1* | 5/2008 | Zimmer | G06F 21/52 713/2 |
| 2008/0163209 A1* | 7/2008 | Rozas | G06F 9/45558 718/1 |
| 2009/0119748 A1* | 5/2009 | Yao | G06F 21/57 726/2 |
| 2009/0172385 A1 | 7/2009 | Datta et al. | |
| 2009/0172471 A1* | 7/2009 | Zimmer | G06F 11/0712 714/17 |
| 2009/0172661 A1* | 7/2009 | Zimmer et al. | 718/1 |
| 2009/0249053 A1* | 10/2009 | Zimmer | G06F 21/575 713/2 |
| 2010/0057982 A1 | 3/2010 | Barde | |
| 2010/0199062 A1* | 8/2010 | Sancho-Dominguez et al. | 711/202 |
| 2010/0241836 A1* | 9/2010 | Proudler | G06F 21/572 713/1 |
| 2013/0042003 A1* | 2/2013 | Franco et al. | 709/226 |

FOREIGN PATENT DOCUMENTS

| | | |
|---|---|---|
| JP | 2005-143120 | 6/2005 |
| JP | 2005-529401 | 9/2005 |
| JP | 2006-252554 | 9/2006 |
| JP | 2007-213465 | 8/2007 |
| JP | 2008-523511 | 7/2008 |
| JP | 2009-508183 | 2/2009 |
| JP | 2009-176213 | 8/2009 |
| JP | 2009-230433 | 10/2009 |
| JP | 2010-517162 | 5/2010 |
| JP | 2011-076505 | 4/2011 |
| JP | 2011-145776 | 7/2011 |
| TW | 200809626 | 2/2008 |

OTHER PUBLICATIONS

Onoue et al, "Control of System Calls from Outside of Virtual Machines", [Online], 2008, pp. 2116-2121, [Retrieved from internet on Feb. 19, 2019], <http://delivery.acm.org/10.1145/1370000/1364196/p2116-onoue.pdf?ip=151.207.250.51&id=1364196&acc=ACTIVE%20SERVICE&key=C15944E53D0ACA63%2E4D4702B0C3E38B35> (Year: 2008).*

Fang et al, "VMGuard: An Integrity Monitoring System for Management Virtual Machines", [Online], 2010, pp. 67-74, [Retrieved form internet on Feb. 19, 2019], <https://ieeexplore.ieee.org/stamp/stamp.jsp?tp=&arnumber=5695587> (Year: 2010).*

U.S. Non-Final Office Action cited in U.S. Appl. No. 14/238,729 dated Mar. 24, 2015; 16 pages.

International Search Report and Written Opinion received in PCT Application No. PCT/US2011/049677, dated Apr. 9, 2012, 9 pgs.

A Smackerel of Opinion (smackerelofopinion.blogspot.com), System Management Mode is Evil, Oct. 2009 (4 pages).

Garfinkel et al., Terra: A Virtual Machine-Based Platform for Trusted Computing, SOSP '03—Oct. 2003 (14 pages).

Joanna Rutkowska, The Invisible Things Lab's blog, Remotely Attacking Network Cards (or why do we need VT-d and TXT), Apr. 2010 (14 pages).

Phrack Magazine (phrack.org), Current Issue: #65, Release Date: Nov. 4, 2008 (22 pages).

Pirker et al., Towards a Virtual Trusted Platform, Journal of Universal Computer Science, vol. 16, No. 4, 2010 (12 pages).

U.S. Appl. No. 14/238,729, Final Rejection dated Sep. 4, 2015, pp. 1-8 and attachments.

Wojtczuk et al., Attacking SMM Memory via Intel CPU Cache Poisoning, 2009 (6 pages).

Haldar et al., Semantic remote attestation: a virtual machine directed approach to trusted computing, USENIX Virtual Machine Research and Technology Symposium, vol. 2004, 2004 (11 pages).

Santos, et al., Towards trusted cloud computing, Proceedings of the 2009 conference on HotCloud (5 pages).

* cited by examiner

VIRTUAL HIGH PRIVILEGE MODE FOR A SYSTEM MANAGEMENT REQUEST

CROSS-REFERENCE TO RELATED APPLICATION

This application is a national stage application under 35 U.S.C. § 371 of PCT/US2011/049677, filed Aug. 30, 2011.

BACKGROUND

An electronic device, such as a computer or other type of device, can include a Basic Input/Output System (BIOS) that is responsible for starting up the electronic device. During startup, the BIOS initializes and configures components of the electronic device, and loads an operating system in the electronic device. In addition, the BIOS can also provide other services, such as a power management service, a thermal management service, a BIOS update service, and so forth.

BRIEF DESCRIPTION OF THE DRAWINGS

Some embodiments are described with respect to the following figures.

DETAILED DESCRIPTION

Figure 1:
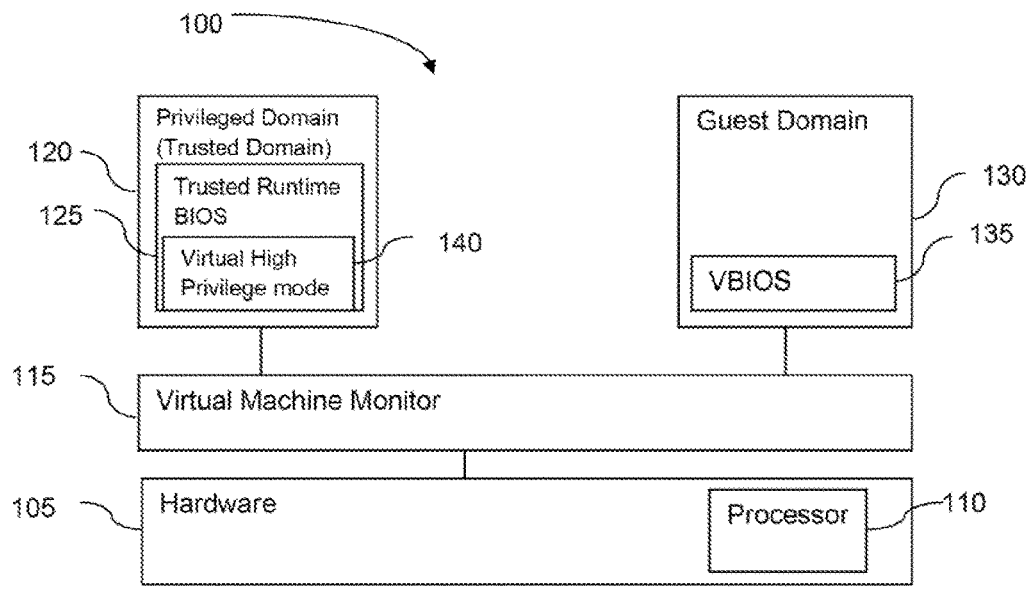
FIG. 1 is a block diagram of a computing system according to an example implementation of a virtual high-privilege mode.

A Basic Input/Output System (BIOS) is usually the first code executed by an electronic device when the electronic device starts. Examples of the electronic device include a computer (e.g. desktop computer, notebook computer, tablet computer, server computer, etc.), a handheld device (e.g. personal digital assistant, smartphone, etc.), an electronic appliance, a gaming console, or any other type of electronic device. The BIOS initializes and configures various hardware components of the electronic device, and loads and starts an operating system (OS) of the electronic device. Code for the BIOS is usually stored on a non-volatile memory, such as a flash memory device or other type of programmable read-only memory (ROM).

The BIOS also provides other functions that can be invoked in the electronic device. Many of such other functions of the BIOS are often executed in the electronic device by entering a system management mode (SMM), which is an operating mode in which OS execution is suspended. Also, in an electronic device having multiple processors or processor cores, all but one of the processors or processor cores may be disabled in SMM mode. To enter SMM mode, a system management interrupt (SMI) is asserted, and an SMI handler (which is part of the BIOS) is executed, often in a relatively high privilege mode, to perform the respective function(s).

There can be various issues with entering SMM mode to perform BIOS functions. First, because OS execution is suspended, normal electronic device operation cannot proceed. Also, in an electronic device in which processor(s) or processor core(s) are disabled during SMM mode, a part of the processing capacity of the electronic device is temporarily deactivated, which means that such part of the processing capacity is unavailable to perform other tasks. Moreover, it can be difficult to predict how long SMM processing may take, which can cause uncertainty in electronic device operation. Moreover, since certain BIOS functions can take a relatively long period of time to complete (e.g. on the order of minutes), status information may not be available to a user of the electronic device, which can result in a disconcerting experience to the user since the user is unable to ascertain whether the electronic device is functioning properly or not.

Security may also be an issue, since malware may attack during SMM operation, which can lead to system corruption. Security measures that are taken to avoid any such attacks against SMM operation can result in increased complexity in the design of an electronic device. Examples of such security measures include locking certain storage areas, including registers and/or a portion of non-volatile memory such as a flash memory device or other type of programmable read-only memory. Also, the security measures may impose a constraint on the performance of certain BIOS functions, such as BIOS code update, which can force such BIOS functions to be performed only at certain times, such as system restart.

Examples of various functions that are often performed in SMM can include any one or a combination of the following: a service to update BIOS code; a service to access or modify a setting of the BIOS; a thermal management service to perform thermal management (e.g. control cooling devices such as fans in the electronic device); a power management service (removing or restoring power to specific hardware components); a service to transition the electronic device between different power states (e.g. hibernation state, sleep state, fully on state, and so forth); a service to process activation of a button or button sequence (that includes activation of some combination of multiple buttons) of the electronic device (e.g. a button to turn on/off a wireless interface component, a hot-key sequence to perform some predefined task, and so forth); a service associated with an ambient light sensor of the electronic device (for detecting ambient light around the electronic device); a service to modify a setting of a hardware component in the electronic device; a service to change a boot order of bootable devices of the electronic device; a service for handling a certain type of call between the OS and the BIOS (e.g. an interrupt 15 call); a service to execute a command of an embedded controller; and a service to support a legacy peripheral device (e.g. a Universal Serial Bus device) under a certain condition.

Although various example BIOS functions are listed above, it is noted that other or alternative BIOS functions can be used in other implementations.

In accordance with some implementations, for more robust system behavior, functions of the BIOS can be provided in a privileged domain of the electronic device, where the privileged domain is a domain of the electronic device that is relatively secure and that has certain predefined privilege(s) not available to other entities in the electronic device. Generally, a "privileged domain" refers to a domain that has predefined privilege(s) that allows an entity in the domain to perform functions in the electronic device that other entities (e.g. OS, application programs, etc.) are not allowed to perform. Also, a privileged domain also has a security mechanism to protect the privileged domain from unauthorized access or attack.

By moving functions of the SMM mode to a virtual high-privilege mode, the electronic device does not have to enter SMM mode to perform such BIOS functions that have been moved into the virtual high-privilege mode. In some implementations, SMM operation can be eliminated altogether from the hardware. In other implementations, SMM operation can still be enabled to perform certain BIOS functions, while the remaining BIOS functions are performed through the virtual high-privilege mode.

Examples of a privileged domain include any or some combination of the following: domain 0, which is often the first domain started by a virtual machine monitor (also referred to as a hypervisor) to perform management tasks; a portion of the virtual machine monitor (or hypervisor); a guest virtual machine that has predefined settings to provide the guest virtual machine with enhanced privileges and/or security; or another type of domain in the electronic device with a predefined special privilege and/or security mechanism. The secure privileged domain can include the trusted runtime BIOS which can include a virtual high-privilege mode for handling system management instructions securely without having to have a component on a peer level with the virtual machine monitor such as a system management mode transfer monitor to separate and secure a virtual high-privilege mode from the other domains.

A "virtual machine" (also referred to as a "virtual appliance" or "virtual partition") refers to some partition or segment of a physical machine (the electronic device) that is provided to virtualize or emulate a physical machine. From the prospective of a user or application, a virtual machine looks like a physical machine. A virtual machine includes an operating system (referred to as a guest operating system) and at least one application program.

A virtual machine monitor (VMM), also referred to as a hypervisor, manages the sharing, by the virtual machines, of the physical resources, including the hardware components, of the electronic device. The VMM virtualizes the physical resources. Each virtual machine has associated virtualized physical resources managed by the VMM. The VMM processes requests for physical resources.

With reference to the figures, FIG. 1 is a block diagram of a computing system according to an example implementation of a virtual high-privilege mode. A computing system 100 can include a processor 110. The processor 110 is part of the hardware 105 of the computing system 100. The processor 110 can be a general purpose processor or an application specific processor. As examples, the hardware 105 can also include: I/O devices, volatile memory, secondary storage, flash memory, a network interface controller, a graphics adapter, and so forth. The system can include a virtual machine monitor 115 to manage the physical resources of the hardware components and virtualize the physical resources. The computing system includes a virtual basic input output system (vBIOS) 135 attached to a guest domain 130. The guest domain 130 is a virtual machine which may execute an operating system such as Microsoft Windows, Linux, Unix, or another operating system.

In some examples, the privileged domain 120 is domain 0, which is an administrative domain started by the VMM 115 upon system startup, and which has enhanced privileges and security mechanisms. Examples of tasks performed by domain 0 include creating and configuring guest domains. Each of domain 0 and guest domains is considered a corresponding virtual machine. The privileged domain 120 can be separate from the VMM 115. In alternative implementations, the privileged domain 120 can be part of the VMM 115. In such alternative implementations, the trusted runtime BIOS function 125 is part of the VMM 115. The privileged domain 120 can be a trusted domain as it is generated or managed by the trusted VMM 115.

The provision of the BIOS function 125 in the privileged domain 120 implements a "BIOS in a cloud," also referred to as "trusted runtime BIOS 125" or BIOS.v. The "cloud" can refer to the privileged domain 120 (or some other trusted domain). The cloud can be located either in the computing system 100 or external of the computing system 100. For example, the cloud containing a trusted runtime BIOS 125 function can be accessible by the computing system 100 over a network. The network may be for example a local, wide or worldwide network.

The computing system 100 may include a virtual high-privilege mode 140 to handle a system management request. The system management request may include at least one of system management interrupt and a system management instruction. The system management requests may be issued by the guest domain 130 for example or the privileged domain 120. While the virtual high-privilege mode 140 is shown in the trusted runtime BIOS within the privileged domain it can be in any trusted domain generated or managed by the VMM or included in the VMM 115 itself. Other domains generated or managed by the VMM that could be the trusted domain may include the privileged domain 120, a virtual appliance, a guest domain 130.

A virtual high-privilege mode 140 to handle the system management requests can prevent the processor 110 or other hardware 105 from entering a system management mode which causes the halting of processes until the system management request is handled. For example if the guest domain 130 generates a system manage request the virtual machine monitor 115 can prevent the system management request from putting the processor 110 in a system management mode and redirect the system management request to the virtual high privilege mode 140 to handle the request. The virtual high privilege mode may have access to the hardware to perform system configuration changes that would otherwise be performed in a system management mode of the processor. In one example the access to the hardware 105 can be provided by the Virtual Machine monitor 115.

Figure 2:
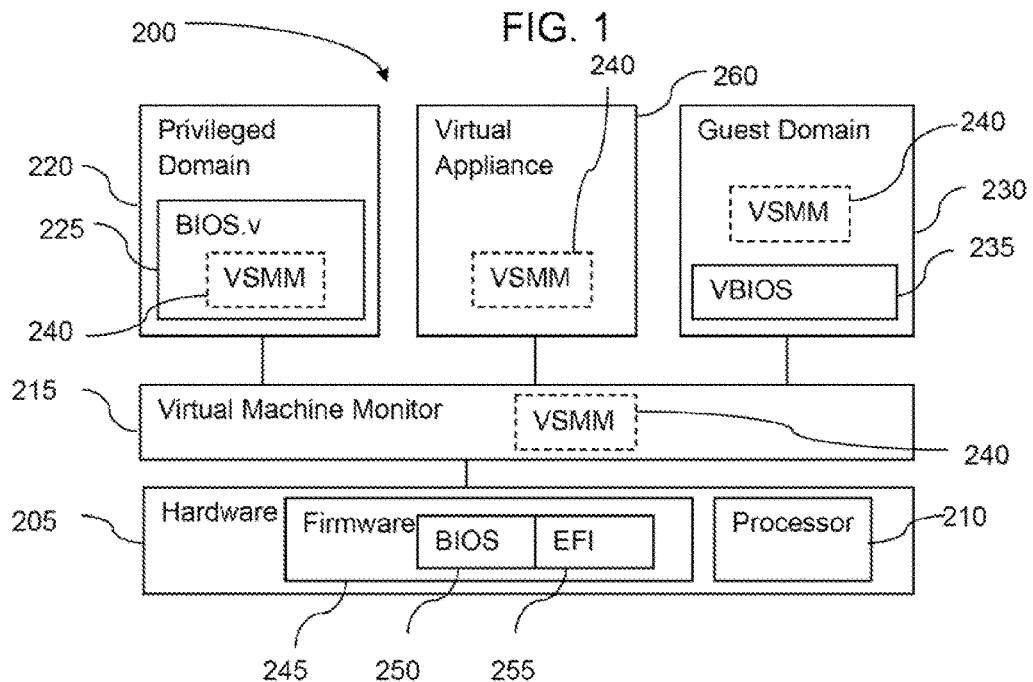
FIG. 2 is a block diagram of a computing system according to an example implementation of a virtual high-privilege mode.

FIG. 2 is a block diagram of a computing system according to an example implementation of a virtual high-privilege mode. A computing system 200 can include a processor 210. The processor 210 is part of the hardware 205 of the computing system 200. The hardware can include firmware 245 which may include the basic input/output system (BIOS) 250 and the extensible firmware interface (EFI) 255. The BIOS 250 may be referred to as a physical BIOS. A "physical BIOS" refers to BIOS code that resides in non-volatile memory such as flash memory or other programmable read-only memory, and which is to be executed upon startup of the computing system 200. In some implementation the physical BIOS may be a reduced (simplified) version of the BIOS since at least part of the system management mode is moved to a virtual high-privilege mode. If a trusted runtime BIOS 225 is implemented the physical BIOS 250 may remain unlocked to allow changes because of the trust attached to the trusted runtime BIOS 225. The processor 210 can be a general purpose processor or an application specific processor. The system can include a virtual machine monitor VMM 215 to manage the physical resources of the hardware components and virtualize the physical resources. The computing system 100 includes a virtual basic input output system (vBIOS) 235 attached to a guest domain 230. The guest domain 230 is a virtual machine which may execute an operating system such as Microsoft Windows, Linux, Unix, or another operating system.

In some examples, the privileged domain 220 is domain 0, an administrative domain started by the VMM 215 upon system startup, which has enhanced privileges and security mechanisms. Examples of tasks performed by domain 0 include creating and configuring guest domains. Each of domain 0 and guest domains is considered a corresponding virtual machine. The privileged domain 220 can be separate from the VMM 215. In alternative implementations, the privileged domain 220 can be part of the VMM 215. In such alternative implementations, the trusted runtime BIOS 225 is part of the VMM 215.

The virtual system management mode 240 is to handle a system management request. The virtual system management mode 240 is a virtual high-privilege mode that can perform functions that put the system hardware 205 into a system management mode. Handling the functions of the system management mode in the virtual system management mode 240 prevents the processor 210 from halting processing of instructions and data while in the system management mode because the processor does not enter the system management mode. In some implementations the processor 210 does not have a system management mode.

In implementations the virtual system management mode 240 can be in any trusted domain generated or managed by the VMM 215, including the VMM 215 itself or a virtual appliance 260, the privileged domain 220 or can be in a guest domain 230. In one example a system management request is generated. The system management request is forwarded to the virtual system management mode 240 for handling the system management request. The system management request can be received by the virtual basic input output system (vBIOS) 235 to forward to the virtual system management mode 240 in one implementation. A system management request can be sent by a web service's application programming interface (API). In another implementation the system management request can be packaged in a Windows management instrumentation (WMI) wrapper. Another implementation includes using a remote procedure call (RPC) to forward the system management request to the virtual system management mode.

In some implementations, BIOS in a cloud is based on the following premises of a VMM-based architecture: the physical BIOS knows and trusts the main runtime entity (VMM 215) that the physical BIOS is booting, and the BIOS-trusted VMM has the ability to trap and turn off all I/O requests (to access BIOS functionality) other than those coming from the privileged domain. In some implementations, a BIOS verification mechanism can be provided to authenticate the origin of the VMM that is to be booted by the computing system. Such verification mechanisms allow an administrator or other user to specify that only an authorized VMM can be booted in the computing system. The verification mechanism assures that the VMM image that is in the computing system has not been modified maliciously, and that the VMM can be trusted. The physical BIOS can verify the VMM image, and ensure that the VMM is booted with a known set of controlled operational settings that have previously been specified. The VMM may then generate and manage the virtual high-privilege mode 240 to handle the system management requests in a trusted environment without causing the hardware 205 to enter a system management mode.

After verifying that an authorized VMM has been booted, the physical BIOS can then defer or omit execution of various security measures that the physical BIOS would normally perform to prevent corruption by unauthorized or malicious code. For example, the physical BIOS can choose to not lock BIOS flash registers and/or portions of flash memory.

In some implementations the trusted runtime BIOS 225 is provided internally in a computing system 200, however the trusted runtime BIOS 225 may also be external the computing system. From the perspective of a guest virtual machine or other entity of the computing system that wishes to access BIOS services, the cloud including the BIOS services can be located anywhere, including in a location that is external of the computing system.

In one implementation with a trusted runtime BIOS, no other domain than privileged domain or another trusted domain will be able to communicate with BIOS. This is made possible by ensuring that all communication means from a guest domain to the BIOS are trapped and routed to the privileged domain portion for the appropriate filter to receive and process. The virtual high-privilege mode in the privilege domain can then process the request and can make direct or indirect calls to the flash or the BIOS. This call from the privileged domain to the BIOS which will then be allowed by the hypervisor to go through since Hypervisor can detect a call originating from the privileged domain rather than a guest domain. Given open but exclusive access to the physical BIOS, the communication from the privileged domain to physical BIOS is secured, the privileged domain can now write or read all settings of BIOS at runtime eliminating a situation where the processor would enter system management mode.

Moving system management request handling to a virtual high-privileged mode has the advantage that more system information and context is available to the virtual machine monitor. For example, if the computing system is constantly triggering a system management request to deal with thermal events, the virtual machine monitor could decide to adjust its scheduling resources appropriately, automatically providing adjustment for allowing the system to cool down that without virtual high-privilege mode would constantly put the processor in SMM.

Figure 3:
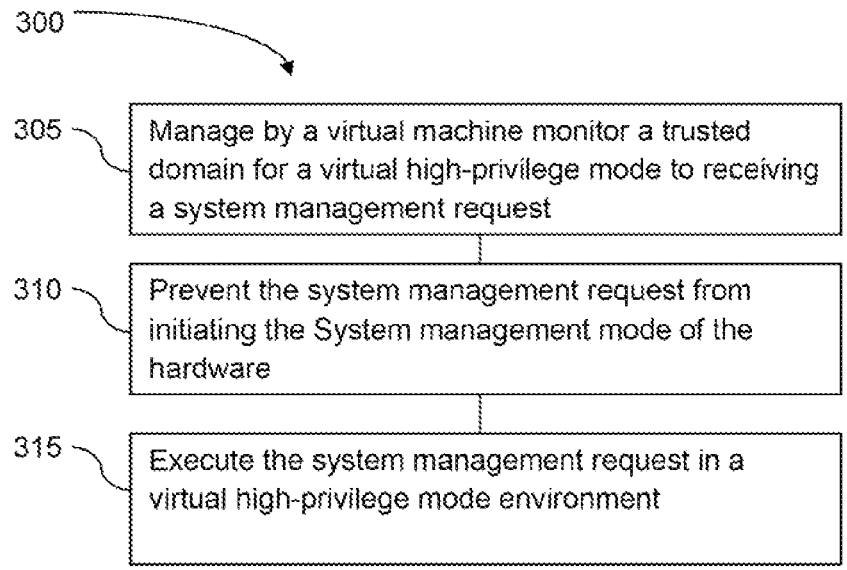
FIG. 3 is a flow diagram of a method of handling system management requests according to an example implementation.

FIG. 3 is a flow diagram of a method 300 of handling system management requests according to an example implementation. The method can manage, by a virtual machine monitor, a trusted domain for a virtual high-privilege mode to receiving a system management request at 305. The trusted domain may be a privileged domain 120 or another domain. The system management request can be one that could put the processor 110 in a system management mode and halt all of the processes that are being executed in the real mode of the processor 110. At 310 the system management request is prevented from initiating a system management mode. The system management request can be routed to a virtual high-privilege mode environment 140. Routing the system management request can be for example by the vBIOS sending the system management request to the virtual high-privilege mode, packaging the system management request in WMI wrapper, making a remote procedure call (RPC) or a web services API. The system management request can be handled in a virtual high-privilege mode environment at 315. The virtual high-privilege mode environment can have access to the hardware to change the system configuration in ways that are not available to a guest domain.

Figure 4:
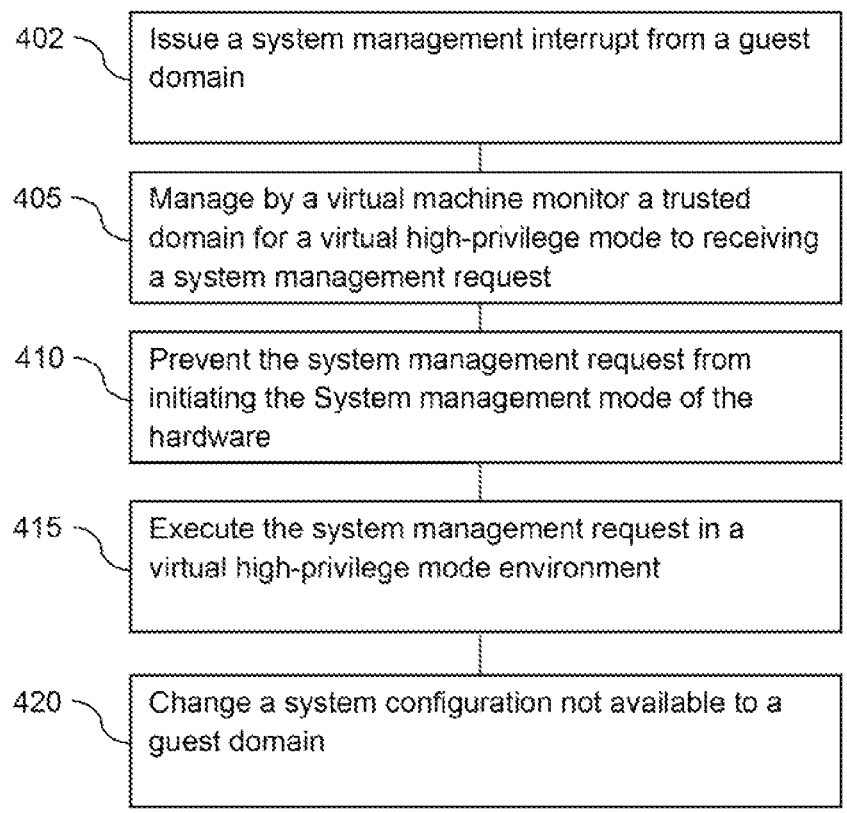
FIG. 4 is a flow diagram of a method of handling system management requests according to an example implementation.

FIG. 4 is a flow diagram of a method of handling system management requests according to an example implementation. The method can begin by issuing a system management request by a domain at 402. The domain can be for example a guest domain 130 or privileged domain 120.

A virtual machine monitor can manage a trusted domain for a virtual high-privilege mode to receiving a system management request at 405. The virtual high privilege mode can receive the system management request which may have been routed by another component such as the VMM 115 or the privilege domain 120. The system management request can be one that could put the processor 110 in a system management mode and halt all of the processes that are being executed in the real mode of the processor 110. At 410 the system management request is prevented from initiating a system management mode. If the system management request is received by something other than the virtual high-privilege mode it can be routed to a virtual high-privilege mode environment 140. Routing the system management request can be for example by the vBIOS sending the system management request to the virtual high-privilege mode, packaging the system management request in WMI wrapper, or making a remote procedure call (RPC). The system management request can be handled in a virtual high-privilege mode environment at 415. The virtual high-privilege mode environment can have access to the hardware to change, at 420, the system configuration in ways that are not available to a guest domain.

Figure 5:
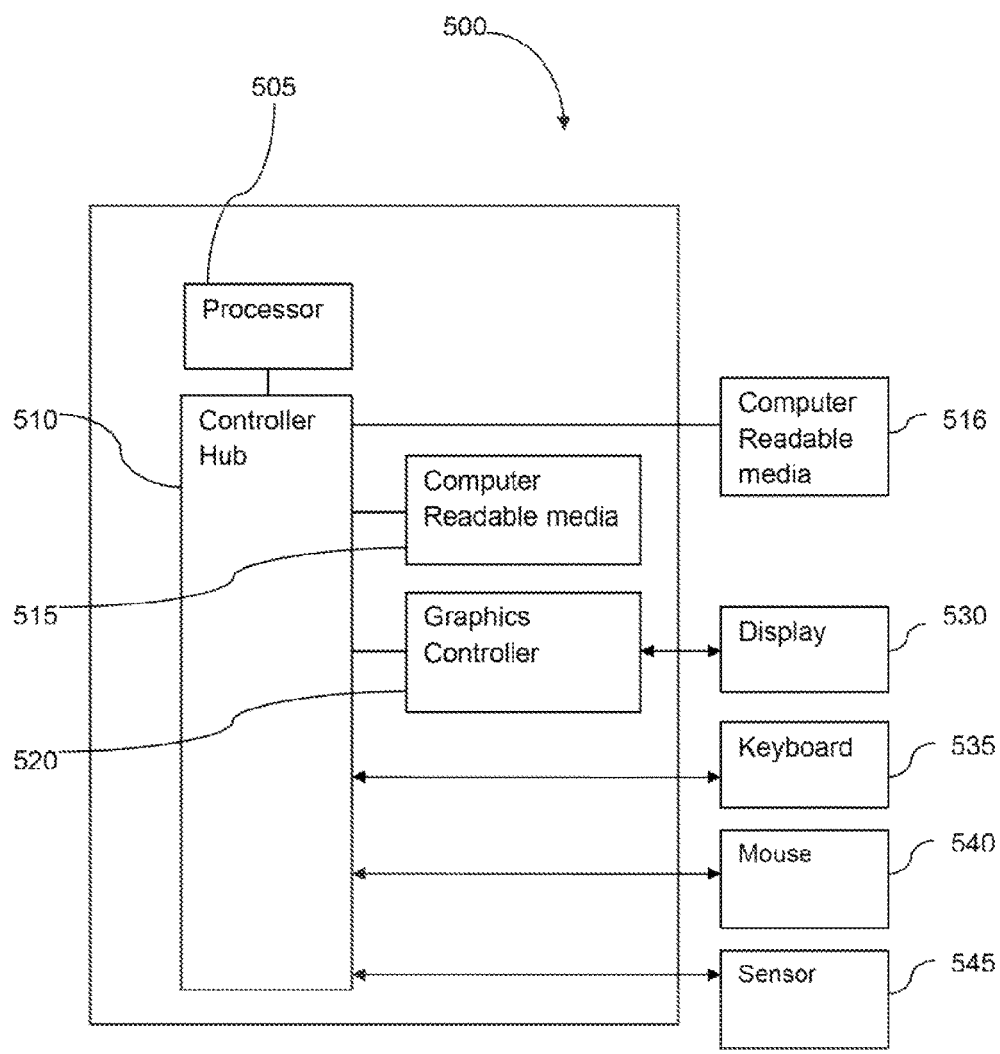
FIG. 5 is a block diagram of a computing system according to an example implementation of a computer readable medium.

FIG. 5 is a block diagram of a computing system 500 according to an example implementation of a computer readable media 515-516. The computer readable media 515-516 can include code that if executed by a processor 505 can cause a computing system to execute a virtual machine monitor. The code can also cause a virtual high-privilege mode to receive a system management request. The system management request can be prevented from initiating a system management mode of the processor. The code can cause the system management request to be handled in a virtual high-privilege mode environment.

The code can cause the virtual high-privilege mode to change a system configuration that cannot be changed by a guest domain. A system management request can be generated by a domain such as a guest domain or a privileged domain to perform system configurations that are not available to the domain in the real mode of the processor.

Various modules, such as those depicted in other figures, can be implemented as machine-readable instructions that can be executed on one or multiple processors. A processor can include a microprocessor, microcontroller, processor module or subsystem, programmable integrated circuit, programmable gate array, or another control or computing device.

The machine-readable instructions can be stored in machine-readable or computer-readable storage media, which can be implemented as one or multiple computer-readable or machine-readable storage media. The storage media can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A computing system comprising:
a processor;
a physical basic input/output system (BIOS);
a virtual machine monitor (VMM) to manage a trusted virtual machine (VM); and
a virtual high-privilege mode in the trusted VM to handle a system management request,
the VMM to trap requests to access functionalities of the physical BIOS from sources other than the trusted VM, the trapping of the requests preventing the requests from being communicated to the physical BIOS.

2. The computing system of claim 1, wherein the virtual high-privilege mode is a virtual system management interrupt mode to handle a system management request.

3. The computing system of claim 2, wherein the processor does not enter a system management mode in response to the system management request.

4. The computing system of claim 1, wherein the trusted VM is a domain 0 VM.

5. The computing system of claim 2, wherein the system management request is provided to the virtual high-privilege mode using one of a virtual basic input output system (vBIOS), a Windows management instrumentation (WMI) wrapper, or a remote procedure call (RPC).

6. The computing system of claim 1, wherein the virtual high-privilege mode in the trusted VM is to respond to the system management request by calling the physical BIOS.

7. The computing system of claim 6, wherein the VMM allows the call of the physical BIOS by the virtual high-privilege mode in the trusted VM to pass to the physical BIOS.

8. The computing system of claim 1, wherein the VMM is to route the system management request from a guest virtual machine to the virtual high-privilege mode in the trusted VM.

9. A method of handling a system management request in a computing system, comprising:
managing, by a virtual machine monitor (VMM), a trusted virtual machine (VM) with a virtual high-privilege mode, the trusted VM with the virtual high-privilege mode to receive the system management request;

preventing the system management request from initiating a system management mode at a processor of the computing system;
handling the system management request by the trusted VM with the virtual high-privilege mode; and
trapping, by the VMM, requests to a physical basic input/output system (BIOS) of the computing system from sources other than the trusted VM, the trapping of the requests preventing the requests from being communicated to the physical BIOS.

10. The method of claim 9, further comprising changing a system configuration of the computing system by the trusted VM with the virtual high-privilege mode.

11. The method of claim 9, further comprising issuing a system management interrupt from a guest domain, the system management request comprising the system management interrupt.

12. The method of claim 9, further comprising:
calling, by the trusted VM with the virtual high-privilege mode, the physical BIOS in response to the system management request.

13. The method of claim 9, further comprising:
routing, by the VMM, the system management request from a guest virtual machine to the trusted VM with the virtual high-privilege mode.

14. The method of claim 9, wherein the trusted VM is a domain 0 VM.

15. The method of claim 9, wherein trapping the requests to the physical BIOS comprises trapping requests to access functionalities of the physical BIOS.

16. A non-transitory computer readable medium storing instructions that upon execution cause a computing system to:
manage, by a virtual machine monitor (VMM), a trusted virtual machine (VM);
receive a system management request by a virtual high-privilege mode environment in the trusted VM;
prevent the system management request from initiating a system management mode;
handle the system management request in the virtual high-privilege mode environment of the trusted VM;
trap, by the VMM, requests to a physical basic input/output system (BIOS) of the computing system from sources other than the trusted VM, the trapping of the requests preventing the requests from being communicated to the physical BIOS.

17. The non-transitory computer readable medium of claim 16, wherein the trusted VM including the virtual high-privilege mode environment is to change a system configuration that is not changeable by a guest domain.

18. The non-transitory computer readable medium of claim 16, wherein the instructions upon execution cause the computing device to:
forward the system management request from a virtual basic input output system (vBIOS) to the trusted VM including the virtual high-privilege mode environment.

19. The non-transitory computer readable medium of claim 16, wherein the instructions upon execution cause the computing system to further:
call, by the trusted VM including the virtual high-privilege mode environment, the physical BIOS in response to the system management request.

20. The non-transitory computer readable medium of claim 16, wherein the instructions upon execution cause the computing system to further:
route, by the VMM, the system management request from a guest virtual machine to the trusted VM with the virtual high-privilege mode.

* * * * *

UNITED STATES PATENT AND TRADEMARK OFFICE
CERTIFICATE OF CORRECTION

PATENT NO. : 10,303,501 B2
APPLICATION NO. : 14/240198
DATED : May 28, 2019
INVENTOR(S) : Valiuddin Y. Ali et al.

Page 1 of 1

It is certified that error appears in the above-identified patent and that said Letters Patent is hereby corrected as shown below:

On the Title Page

In item (75), Inventors, in Column 1, Line 4, delete "Lyons" and insert -- Lyon --, therefor.

Signed and Sealed this
Twenty-eighth Day of April, 2020

Andrei Iancu
*Director of the United States Patent and Trademark Office*